United States Patent [19]
Peace

[11] 3,828,464
[45] Aug. 13, 1974

[54] DISPENSING APPARATUS FOR APPLYING EXTERMINATING AND PRESERVATIVE COMPOSITIONS

[76] Inventor: Franklin Peace, c/o National Volume Sales Corp., 1024 Cottman Ave., Philadelphia, Pa. 19111

[22] Filed: May 25, 1972

[21] Appl. No.: 257,040

Related U.S. Application Data

[63] Continuation-in-part of Ser. No. 84,094, Oct. 26, 1970, Pat. No. 3,692,469.

[52] U.S. Cl. .............................................. 43/131
[51] Int. Cl. ........................................... A01m 25/00
[58] Field of Search ............ 43/131, 124, 132; 61/7, 61/73, 71, 63; 47/57.5

[56] References Cited
UNITED STATES PATENTS

| | | | |
|---|---|---|---|
| 342,885 | 6/1886 | Thompson et al. | 119/51 R |
| 594,785 | 11/1897 | Fouzer | 43/124 |
| 1,233,332 | 7/1917 | Erickson | 43/131 |
| 1,240,733 | 9/1917 | Kleckner | 21/73 |
| 2,808,679 | 10/1957 | Collins | 43/131 |
| 3,032,915 | 5/1962 | Giroud-Abel | 43/131 |
| 3,040,470 | 6/1962 | Kanin | 43/131 |
| 3,094,805 | 6/1963 | Luck | 43/131 |

*Primary Examiner*—Warner H. Camp
*Attorney, Agent, or Firm*—Seidel, Gonda & Goldhammer

[57] ABSTRACT

A container is provided for a wood-penetrating preservative or exterminating composition for insects and rodents. Any preservative composition in the container contacts a wood member to be treated, and penetrates into it. In each embodiment, the composition is dispensed from the container by gravity feed. Adhesive material or conventional fasteners may be used to fasten the container to a member or to a support.

7 Claims, 4 Drawing Figures

DISPENSING APPARATUS FOR APPLYING EXTERMINATING AND PRESERVATIVE COMPOSITIONS

This application is a continuation-in-part of my copending application Ser. No. 84,094 filed Oct. 26, 1970 and now U.S. Pat. No. 3,692,469.

This invention relates to an apparatus and method for dispensing preservative compositions to wood and exterminating compositions. More particularly, this invention relates to apparatus wherein a quantity of preservative material is placed in a container, which may wooden applied to a surface to be treated, in such a manner that the composition contacts and penetrates the surface or dispenses compositions for exterminating insects and rodents.

In one currently used method of preserving wood, a viscous composition containing a rot preventative, an insecticide, and suitable solvents and emulsifiers is applied to the treated member by surface application using a brush, towel, mitt or the like, or by means of a caulking gun. As an alternative, holes are drilled in the member to be treated, and the composition placed in holes by means of a caulking gun.

The foregoing techniques have certain shortcomings. For example, the surface application techniques necessarily leave a surface of the treatment material exposed to random contact by humans or pets. This is a serious matter, since the compositions involved are highly toxic, and may be absorbed through the skin. In the latter technique, it is necessary to drill holes in the treated members, and this is highly undesirable. Indeed, the principal purpose of treatment is to prevent weakening of the member, which necessarily occurs when holes are made.

In view of the foregoing, it is an object of this invention to provide an apparatus for applying exterminating and preservative compositions to wood, wherein the compositions are retained in contact with the wood in a positive manner, to facilitate penetration of the wood.

It is another object of this invention to provide an apparatus wherein an exterminating and preservative composition is fed by gravity, and penetrates wood to be treated with the aid of capillary action.

It is another object of this invention to provide an apparatus wherein an insecticide and preservative composition is applied to wood, but not exposed to accidental contact.

It is yet another object of this invention to provide sanitary apparatus for dispensing an insecticide or rodenticide composition.

It is another object to provide an apparatus wherein the quantity of the treating composition remaining in a container is readily apparent by visual inspection.

It is still another object to provide an apparatus wherein a supply of the treating composition in a container may be replenished from time-to-time.

Other objects will appear hereinafter.

The foregoing and other objects are realized in one presently preferred form of the invention by apparatus comprising a vertically oriented hollow container adapted to receive and retain a quantity of a composition therein. The container has a mouth portion for admitting the composition to its interior and an open side wall portion. Means are provided for affixing the container to a surface of a member to be treated or a convenient support surface so that said open side wall portion sealingly engages the surface. In one form of the apparatus, a layer of adhesive is provided on a lip around the opening, and serves to adhere the container to the surface. In another form, a flange is provided for nailing or screwing of the container to the surface. The container may be made large enough to extend from top to bottom of a beam, thus blocking the passage of wood-destroying insects, such as termites from passage within a wooden beam. The container may also be used to dispense the liquid insecticide through pinhole openings by capillary action. The same container may be used for dispensing a rodenticide. Thus, a single container may be used to treat a wooden surface, dispense an insecticide or dispense a rodenticide.

The container may be of a conical shape, the angled side of the container serving to direct the composition toward a surface to be treated. Also, the container may be made transparent, so that a simple visual inspection can determine whether or not, and to what extent, the composition has been absorbed.

FOr the purpose of illustrating the invention, there is shown in the drawings forms which are presently preferred; it being understood, however, that this invention is not limited to the precise arrangements and instrumentalities shown.

Figure 1:
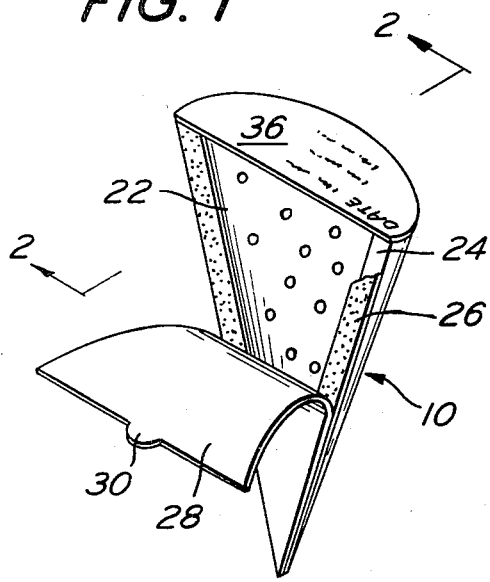
FIG. 1 is a perspective view, showing apparatus in accordance with the invention.
Figure 2:
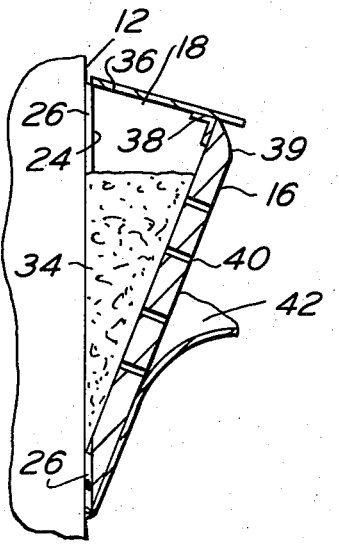
FIG. 2 is a cross-sectional view taken along the line 2—2 in FIG. 1 and showing the apparatus mounted on a vertical surface.

Referring now to the drawings in detail, wherein like numerals indicate like elements, there is seen in FIGS. 1 and 2 apparatus, designated generally by the reference numeral 10, applied to a vertical surface such as a wood en beam 12.

Referring to FIGS. 1 and 2, the apparatus 10 includes a hollow container 16, having an open mouth portion 18 at the upper end thereof. The mouth portion 18 is surrounded by a peripheral inclined planar lip. The container 16 also includes an open side wall portion 22, surrounded by a peripheral lip 24. Container 16 is a lightweight material inert with respect to the composition to be dispensed.

A layer of adhesive 26, preferably of the pressure-sensitive type, overlies the peripheral lip 24. A sealing member 28 of foil or sheet plastic polymeric material of the expendable type is bonded to the lip 24 by the adhesive 26. The sealing member 28 may be provided with a tab, such as the tab 30 to facilitate separation of the sealing member 28 from the lip 24.

Referring to FIG. 2, the apparatus 10 is seen in place affixed to a vertical surfaces 12 such as a wooden beam. The adhesive 26 couples the peripheral lip 24 to the surface 12, and effects a seal therebetween. The adhesive 26, it should be understood, is sufficiently thick to accommodate minor irregularities such as grain, saw marks, or the like on the surface 12.

Within the container 16 is a quantity of wood-treating composition 34. One suitable composition is the viscous substance described in U.S. Pat. No. 2,709,640 which contains a penetrating fungicidal compound (pentachlorophenol), an insecticide (heptachlor), suitable solvents and emulsifiers, and water. Other compositions which may occur to those skilled in the art may be used, if desired. The composition 34 may be described as a preservative and insecticide, it being understood that the apparatus 10 may be used to apply any suitable substance which affords protection from fungi or insects.

When the container 16 is positioned as shown in FIG. 2, the composition 34 flows downwardly along the lower wall of the container 16, toward the open side wall portion 22, and into contact with the surface 12.

The composition 34 ultimately penetrates the surface 12 by capillary action, and protects the surface 12 from damage due to wood-boring insects, such as termites, or due to attack by organisms of the sort which cause dry rot and other forms of wood decay. The composition tends to migrate downwardly due to gravity, and to protect the lower parts of treated members. Such parts are especially susceptible to attack by termites and to decay. Because of the height of the container 16, however, the composition 34 penetrates the surface 12 from top to bottom. This prevents progress of destructive agents or conditions along the length of the member.

If the container 16 is made of transparent material, a rapid visual inspection is all that is required to determine whether the composition 34 has in fact been absorbed into the treated member. The container can be refilled periodically by pivoting the cover or flap 36 disposed over the mouth 18. Cover 36 prevents ingress of foreign matter and provides a convenient surface on which dates may be applied to keep a record of when and how much composition has been introduced into container 16.

The cover 36 is connected to the container 16 by a concealed hinge 38 which may be a piece of tape. The upper edge of the container is provided with a bevel portion 39 to permit pivotable movement of cover 36. Other forms of hinges may be used if desired.

If it is desired to use the container 16 to dispense an insecticide, the composition 34 would be a scented composition such as Kepone. The insecticide would be dispensed to the outer surface of container 16 by the pinholes 40 which have been blocked by a barrier such as the adhesive tape layer 42. Layer 42 may be transparent so that the rate of consumption may be observed even though the container is opaque. The number and size of holes 40 may be varied depending on the viscosity of the insecticide. The insecticide collects as a thin film on the outer surface of container 16 to attract insects which are exterminated thereby.

Figure 3:
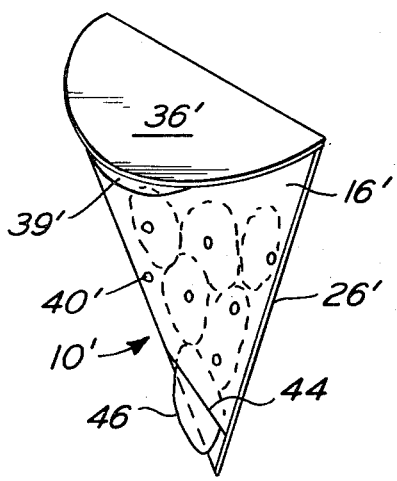
FIG. 3 is a perspective view showing another embodiment of an apparatus in accordance with the invention.

Referring now to FIG. 3, there is seen a modified form of the apparatus, wherein elements corresponding to those previously described are designated by like primed reference numerals. The apparatus 10' includes a container 16' having an enlarged opening 44 at its lower end so that a rodenticide 46 may be dispensed therefrom. The rodenticide 46 is preferably in the form of sealed bags containing an exterminating composition such as Prolin, Warfarin, Diphacin, etc. The bags are preferably too large to completely fall through the opening 44. The apparatus 10' is applied to a supporting surface close to the floor. The bag acts as a barrier to temporarily prevent direct access to the rodenticide. The rodents can tear a hole in the exposed bag to gain access to the composition. Thereafter, another bag in the container will take its place and be partially exposed through opening 44.

Thus, it will be seen that apparatus 10' is in the form of an automatic rodent killing station wherein a rodenticide is dispensed at a rate corresponding to the rate of consumption. The cover 36' likewise is used to make a record of refills and dates involved so that a record may be kept of the rate of consumption at each container.

Figure 4:
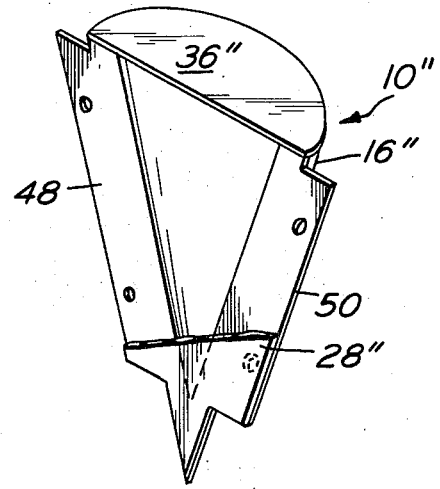
FIG. 4 is a perspective view of another embodiment of an apparatus in accordance with the invention.

Referring to FIG. 4, there is seen another modified form of the apparatus, wherein elements corresponding to those previously described are designated by like double-primed reference numerals. Thus, the apparatus 10'' differs from those described above by the provision of flanges 48 and 50 whereby the container 16'' may be secured to a supporting surface by nails or screws instead of adhesive. If the composition to be dispensed has a propensity to attack the surface which supports the container, a sealing member such as member 28'' could be used to cover the open side of the container and prevent direct contact between the surface and the composition.

The containers described above may be made from a wide variety of materials including polymeric plastic, paper treated to be non-absorbent, lightweight metals such as aluminum, ceramic, etc. A single container is adapted to be used for dispensing different types of exterminating compositions. If desired, the opening 44 in container 16' may be provided with a removable closure whereby a single container could be used to treat wood surfaces, dispense an insecticide for consumption by surrounding insects or dispense a rodenticide. In any event, the present invention provides an exterminating station which is safe, visible, easy to install, and self-feeding while at the same time is adapted to provide a record of usage.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for dispensing exterminating materials including insecticides, rodenticides and preservatives, comprising a hollow body with an open side, means to secure said body to an upright support with said open side adjacent said support, a movable cover at the upper end of the body to facilitate refilling the body, said body having at least one hole through which an exterminating material may be dispensed, said hole being adjacent an end of the body remote from the cover, and a barrier means associated with the hole to temporarily prevent direct access to the exterminating material, said barrier means including a sealed bag in said body and containing the material to be dispensed, said bag being partially exposed through the hole and being of such size that it may not be removed through the hole without rupturing it.

2. Apparatus in accordance with claim 1 wherein said body has flanges adjacent the open side to facilitate securement to an upright support and pressure sensitive adhesive on the exposed surface of said flanges.

3. Apparatus in accordance with claim 1 wherein said barrier means includes a removable layer overlying said hole.

4. Apparatus for dispensing exterminating materials including insecticides, rodenticides and the like, comprising a hollow body, means to secure said body to an upright support, a movable cover at one end of the body to facilitate refilling the body, said body having at least one hole adjacent an end of the body remote from the cover through which an exterminating material may be dispensed, and a barrier means associated with the hole to temporarily prevent direct access to the exterminating material, said barrier means including a sealed bag in said body and containing the material to be dispensed, said bag being larger than the size of said hole and partially exposed through said hole.

5. Apparatus in accordance with claim 4 wherein said barrier means includes a removable layer attached to said body and overlying said hole.

6. Apparatus in accordance with claim 4 wherein said body is tapered toward said hole so that the cross sectional area of the body is smaller at said hole than at a location adjacent said cover.

7. Apparatus in accordance with claim 1 including a plurality of discrete sealed bags in said body, each bag containing material to be dispensed.

* * * * *